United States Patent
Tietjen et al.

(10) Patent No.: US 7,289,391 B2
(45) Date of Patent: Oct. 30, 2007

(54) NARROWBAND PHASE DIFFERENCE MEASUREMENT TECHNIQUE FOR SONAR APPLICATIONS

(75) Inventors: Byron W. Tietjen, Baldwinsville, NY (US); Thaddeus J. Kurpiewski, Manlius, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 337 days.

(21) Appl. No.: 10/987,629

(22) Filed: Nov. 12, 2004

(65) Prior Publication Data

US 2006/0104159 A1     May 18, 2006

(51) Int. Cl.
*G01S 15/04*     (2006.01)
*G01S 3/80*     (2006.01)

(52) U.S. Cl. ......................................... 367/125; 367/92
(58) Field of Classification Search ................... 367/87, 367/92, 125
See application file for complete search history.

(56) References Cited

U.S. PATENT DOCUMENTS 4,905,207 A * 2/1990 Fellinger et al. ............... 367/99
5,561,641 A * 10/1996 Nishimori et al. ........... 367/125
5,745,437 A * 4/1998 Wachter et al. ............. 367/100

* cited by examiner

*Primary Examiner*—Ian J. Lobo
(74) *Attorney, Agent, or Firm*—George R. McGuire; David L. Nocilly; Bond, Schoeneck & King, PLLC (57) ABSTRACT

The present invention is directed to a sonar system that includes a transmitter configured to direct multi-frequency transmit signals into a propagation channel. Each multi-frequency transmit signal includes a first frequency and a second frequency. A receiver is tuned to receive multi-frequency return signals propagating in the propagation channel. Each multi-frequency return signal includes a first frequency return signal and a second frequency return signal. The first frequency return signal has a first phase and the second frequency return signal having a second phase. A signal processor is coupled to the receiver. The signal processor is configured to extract the first phase and the second phase from the multi-frequency return signal and calculate a phase difference. The phase difference is the difference between the first phase and the second phase. The phase difference corresponds to an acoustic impedance value of a material disposed in the propagation channel, and may be used to detect and classify a target of interest in background noise.

44 Claims, 8 Drawing Sheets

NARROWBAND PHASE DIFFERENCE MEASUREMENT TECHNIQUE FOR SONAR APPLICATIONS

BACKGROUND OF THE INVENTION

1. Field of the Invention

The present invention relates generally to sonar, and particularly to a system and method for processing active sonar return signals.

2. Technical Background

Active sonar refers to sonar systems that employ radiating acoustic sources to search for one or more submerged objects. Conventional sonar systems may be configured to direct a highly directional beam of sonic energy on a periodic basis. All sonar systems include a receiver that is configured to detect echoes reflected from any object(s) within the propagation channel.

Sonar devices tend to experience high transmission losses which increase as a function of the frequency of the propagated energy. Active sonar return signal propagation is affected by the channel and/or the characteristics of the target. Signal distortion in an active sonar system may occur for various reasons. For example, irregular sea bottoms and surface interactions may cause distortion. Distortion may also be caused by nonlinear resonant scattering within the propagation channel, reverberation, non-homogenous responses due to channel and/or target interactions, target scattering profiles, multi-path reflections, noise generated by waves, transmission losses, and/or changing distances from the target.

On the other hand, sonar receivers typically do not fully utilize the phase or phase difference information contained within the received waveform when processing active sonar return signals. Return signal data is often processed by evaluating target amplitude. Any phase information that may have been present is not processed, and is therefore lost. This approach to processing sonar return signals may result in target detection when the target amplitude is above the background noise or reverberation. However, when the amplitude of a return is less than or approximately equal to than the background noise, a receiver employing simple detection and thresholding techniques may not extract the target of interest.

What is needed is a system that is configured to use the phase information in the sonar return signal. In particular, what is needed is a sonar receiver that processes the phase of the target of interest to distinguish the target from the background phase.

SUMMARY OF THE INVENTION

The present invention is directed to a system that uses the phase information in the sonar return signal to distinguish the target of interest from its environment. The present invention processes a sonar return signal to obtain the acoustic impedance of a target of interest. The acoustic impedance is a complex quantity that affects the phase of a return sonar signal. Accordingly, the acoustic impedance of the target background, i.e., the ocean medium and/or the ocean bottom, is typically quite different than the acoustic impedance of a target-of-interest because the materials are different. Accordingly, the target-of-interest may be more easily detected in its ocean environment by evaluating the phase difference information in the sonar return signals. Further, this phase difference data may be processed to determine the material composition of the target. Thus, the present invention is configured to both improve target detectability and provide active target classification.

One aspect of the present invention is directed to a sonar system that includes a transmitter configured to direct multi-frequency transmit signals into a propagation channel. Each multi-frequency transmit signal includes a first frequency and a second frequency. A receiver is tuned to receive multi-frequency return signals propagating in the propagation channel. Each multi-frequency return signal includes a first frequency return signal and a second frequency return signal. The first frequency return signal has a first phase and the second frequency return signal having a second phase. A signal processor is coupled to the receiver. The signal processor is configured to extract the first phase and the second phase from the multi-frequency return signal and calculate a phase difference. The phase difference is the difference between the first phase and the second phase. The phase difference is related to the acoustic impedance value of a material disposed in the propagation channel.

In another aspect, the present invention includes method for detecting an object. The method includes the steps of transmitting a multi-frequency signal into a propagation channel. The multi-frequency transmit signal includes a first frequency and a second frequency. A multi-frequency return signal propagating in the propagation channel is received. The multi-frequency return signal includes a first frequency return signal and a second frequency return signal. The first frequency return signal has a first phase and the second frequency return signal having a second phase. A phase difference is extracted from the multi-frequency return signal. The phase difference is the difference between the first phase and the at least one second phase. The phase difference is related to the acoustic impedance value of a material disposed in the propagation channel.

In yet another aspect, the present invention is directed to sonar receiver system including a receiver tuned to receive multi-frequency return signals propagating in the propagation channel. Each multi-frequency return signal includes a first frequency return signal and a second frequency return signal. The first frequency return signal has a first phase and the second frequency return signal having a second phase. A signal processor is coupled to the receiver. The signal processor is configured to extract the first phase and the second phase from the multi-frequency return signal and calculate a phase difference. The phase difference is the difference between the first phase and the second phase. The phase difference is related to the acoustic impedance value of a material disposed in the propagation channel.

In yet another aspect, the present invention is directed to sonar receiver system. The sonar system includes a receiver tuned to receive multi-frequency return signals propagating in the propagation channel. Each multi-frequency return signal includes a first frequency return signal and a second frequency return signal. The first frequency return signal has a first phase and the second frequency return signal having a second phase. A signal processor is coupled to the receiver. The signal processor being programmed to: extract the first phase and the second phase from at least one of the multi-frequency return signals; and calculate the difference between the first phase and the second phase.

In yet another aspect, the present invention is directed to sonar receiver system. The sonar system includes a receiver tuned to receive multi-frequency return signals propagating in the propagation channel, each multi-frequency return signal including a first frequency return signal and a second frequency return signal, the first frequency return signal having a first phase and the second frequency return signal having a second phase. A signal processor is coupled to the receiver. The signal processor is programmed to: extract a plurality of phase difference values from a sequence of multi-frequency return signals; determine an acoustic impedance for each phase difference value of the plurality of phase difference values to obtain a plurality of acoustic impedance value; compare each of the plurality of acoustic impedance values with at least one contiguous acoustic impedance values; and perform a target detection decision based on the comparison of each of the plurality of acoustic impedance values with the at least one contiguous acoustic impedance value.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the sonar system of the present invention is shown in FIG. 1, and is designated generally throughout by reference numeral 10.

Figure 1:
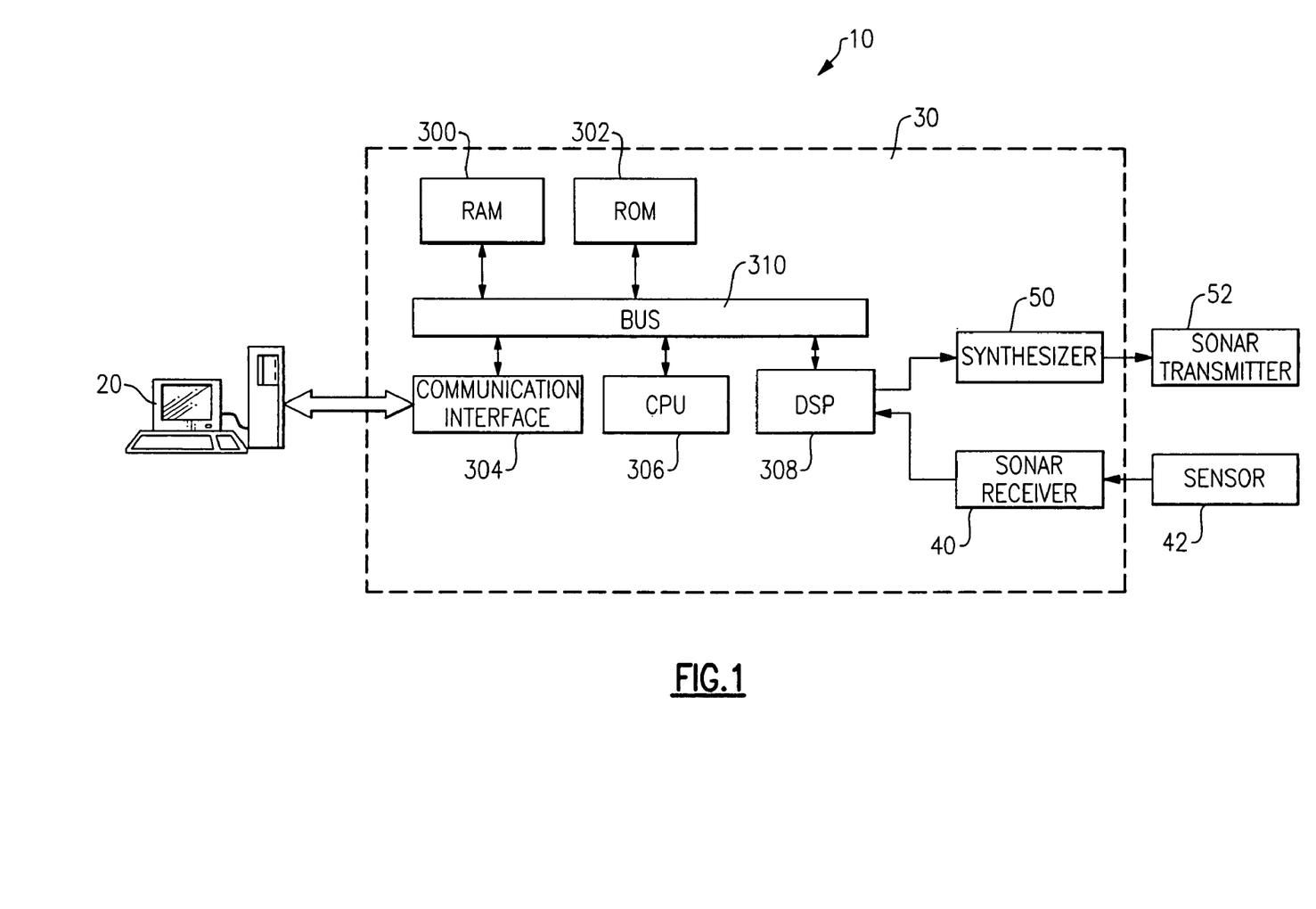
FIG. 1 is a block diagram of a sonar system in accordance with an embodiment of the present invention.

As embodied herein and depicted in FIG. 1, a block diagram of a sonar system 10 in accordance with an embodiment of the present invention is disclosed. System 10 includes an operator interface 20, a processor module 30, sonar receive side equipment (40, 42) and sonar transmission equipment (50, 52). In one embodiment, processor module 30 includes RAM, ROM, Communications interface 304, CPU, and digital signal processor (DSP) 308 coupled to buss 310. DSP 308 drives frequency synthesizer 50, which is in turn coupled to transmitter 52. Return signs are provided by hydrophonic sensor element 42. Sensor 42 provides receiver 40 with analog return signals. Receiver 40 provides DSP 308 with digitized return signals.

Of course, bus system 310 is configured to communicate data, addressing, and control data between CPU 306, DSP 308, Interface 304, RAM 300, and ROM 302. Random access memory (RAM) 300, or other dynamic storage devices, is coupled to the bus 310 and is employed to store data and instructions for execution by CPU 306. RAM 300 may also be used for storing temporary variables or other intermediate information during execution of instructions by CPU 306. The processor module 30 may further include a read only memory (ROM) 302, or other such static storage devices, coupled to the bus 310. ROM 302 is configured to store static data and instructions for the CPU 306.

CPU 306 is employed to run the system operating system and control communications between the operator interface by executing an arrangement of instructions contained in main ROM 302. Such instructions can be read into RAM 300. However, the signal processing functionality may be performed by DSP 308.

Operator interface 20 may be coupled via the bus 310 by way of communications interface 304. Operator interface 20 typically includes a display, such as a cathode ray tube (CRT), liquid crystal display, active matrix display, or plasma display, for displaying information to a computer user. Operator interface 20 also typically includes an input device, such as a keyboard including alphanumeric and other keys, for communicating information and command selections to the processor module 30. Another type of user input device is a cursor control, such as a mouse, a trackball, or cursor direction keys, for communicating direction information and command selections to the processor module 30, and for controlling cursor movement on the display.

The term "computer-readable medium" as used herein refers to any medium that participates in providing instructions to CPU 306 and/or DSP 308 for execution. Such a medium may take many forms, including but not limited to non-volatile media, volatile media, and transmission media. Non-volatile media include, for example, optical or magnetic disks. Volatile media include dynamic memory, such as RAM 300. Transmission media include coaxial cables, copper wire and fiber optics, including the backplane that comprise the bus 310. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

In accordance with the invention, the phase, and amount of reflection, of a return signal is a function of the Acoustic Impedances of the material generating the return signal. In particular, the phase is a function of the Young's Modulus of a target and surrounding material. The present invention simultaneously transmits at least two narrowband signals into a propagation channel, which is typically an oceanic medium. The returns from these transmissions are processed in such a way as to measure the difference in phases between the two frequencies. Of course, those of ordinary skill in the art will recognize that more than two frequencies may be employed. The phase difference is dependent upon frequency, which is why at least two frequencies are used in the present invention.

As noted above, the phase difference is a function of the complex components that makeup the target's acoustic (or mechanical) impedance value, namely the density and the Young's Modulus of the target. The impedance value may be determined from the measured phase of the returned echo and compared to a tabular data file of various known materials. Accordingly, the present invention may be configured to determine the material of a detected target. By using at least two narrowband signals to measure phase differences, there is not need for a wideband system.

Acoustic impedance is analogous to electrical impedance. It includes a resistive component and a reactance. In particular, the acoustic impedance is the measurement of the reactance to the resistance. Because certain parameters in the acoustic impedance may not be in phase, the acoustic impedance may be expressed as a complex number.

$$Z = R + jX \quad (1)$$

where R is the resistance and X is the reactance of Z, the acoustic impedance.

$$R = \rho c \quad (2)$$

where $\rho$ is the density of the material and c is the speed of sound in the propagation channel.

$$X = X_L - X_C \quad (3)$$

using the analogy to electrical engineering, $X_L$ is the "inductive" reactance and $X_C$ is the "capacitive" reactance. The inductive reactance is further defined as:

$$X_L = \omega \rho \quad (4)$$

where $\omega$ is the angular frequency and, as noted above, where $\rho$ is the density of the material. The capacitive reactance is further defined as:

$$X_C = \frac{1}{\omega c} = \frac{1}{\beta + \frac{4}{3}\zeta} \quad (5)$$

where $\beta$ is the bulk modulus and $\xi$ is the shear modulus.

The present invention recognizes that a reflected signal will change in phase. Equation (1) provides the expression for the acoustic impedance in rectangular form. Accordingly, the expression in polar coordinates is:

$$Z = Me^{j\phi} \quad (6)$$

where M=$\rho$, and $\Phi$ represents the phase. Accordingly, $$\phi = \arctan\left(\frac{R}{X}\right) \quad (7)$$

Because X includes both the inductive and capacitive reactance values, X is a function of frequency. Thus, it follows that the phase is a function of frequency as well. Further, the X and R values are dependent on the properties of the reflected surface. If two (2) frequencies are used in the transmission, i.e., $\omega_1$ and $\omega_2$, then: the phase difference equals:

$$\Delta\phi = \phi_2 - \phi_2 = \text{ArcTan}\,[f(\omega_2)] - \text{ArcTan}\,[f(\omega_1)] \quad (8)$$

Plugging in equations (3)-(5) into equation (8), and setting the denominator of equation (5) to equal "$\eta$," the phase difference may be expressed as:

$$\Delta\phi = \text{ArcTan}\left[\left(\omega_2\rho - \frac{\eta}{\omega_2}\right)\bigg/\rho c\right] - \text{ArcTan}\left[\left(\omega_1\rho - \frac{\eta}{\omega_1}\right)\bigg/\rho c\right] \quad (9)$$

Thus, the phase difference is a function material properties and frequency.

Figure 2:
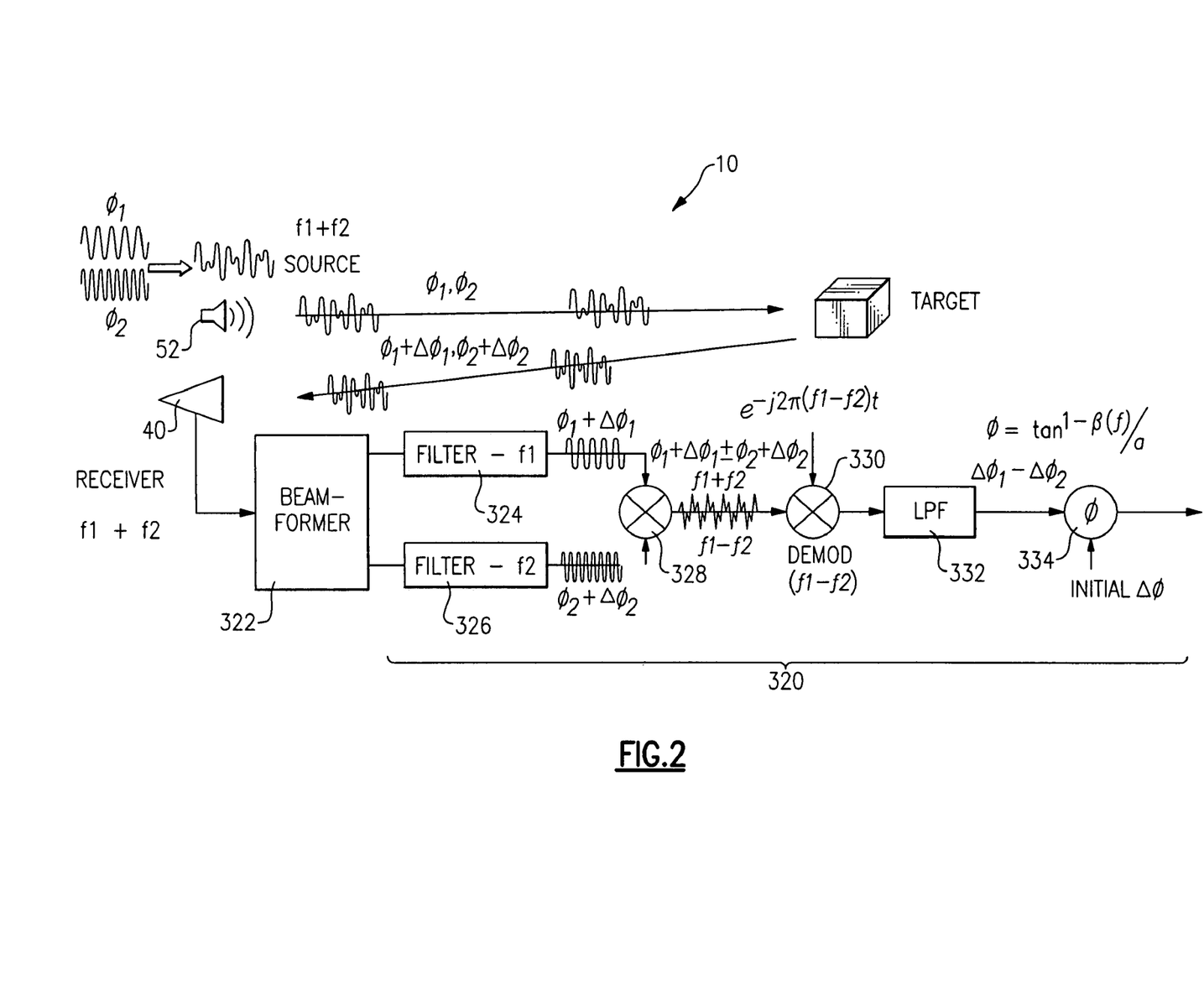
FIG. 2 is a three-dimensional plot comparing the phase shift of a reflected signal.

Referring to FIG. 2, a block diagram of the signal processing flow 320 in accordance with a first embodiment of the present invention is disclosed. Sonar transmitter 52 which is configured to actively ping, i.e., direct sonic energy into a propagation channel. The multi-frequency transmit signal is of the form:

$$T(f) = \sin(\omega_1 t + \phi_1) + \sin(\omega_2 t + \phi_2) \quad (10)$$

The multi-frequency transit signal propagates in the channel until it is reflected off the target, as shown in FIG. 2. The reflection causes a phase shift to occur. As described above in great detail, the phase shift is a function of the material composition of the target. The multi-frequency received signal is of the form:

$$R(f) = \sin(\omega_1 t + \phi_1 + \Delta\phi_1) + \sin(\omega_2 t + \phi_2 + \Delta\phi_2) \quad (11)$$

The receiver 40 obtains R(f) from the hydrophonic sensor element 42 as shown in FIG. 2. Receiver 40 typical includes a pre-amplifier and filter coupled to the hydrophonic sensor element 42. The received signal is directed into an A/D/ converter and digitized. The digitized signal is directed into beam former 322. Beam forming is a type of spatial filtering that is configured to distinguish the spatial properties of a return signal from noise and/or interference.

The digitized and filtered signal is directed into parallel filters 324, 326, which in one embodiment, are programmed modules employed by DSP 308. Filter 324 is a bandpass filter that is configured to allow first frequency signals { $\sin(\omega_1 t + \phi_1 + \Delta\phi_1)$} to pass through. Filter 326 is disposed in parallel with filter 18 and allows second frequency signals $\sin(\omega_2 t + \phi_2 + \Delta\phi_2)$ to pass. The first frequency signal is multiplied by the second frequency signal to obtain:

$$S(t) = \cos\,[(\omega_1 - \omega_2)t + (\phi_1 - \phi_2) + (\Delta\phi_1 - \Delta\phi_2)] \quad (12)$$

In actuality, equation (12) is written as a continuous signal. Because the signal is processed by a signal processor, equation (12) is processed in its discrete form.

Subsequently, signal s(t) is directed into demodulator 330 whereby the signal is frequency shifted to baseband. Mathematically, this is accomplished by converting the cosine representation of equation (12) into an exponential series by way of Euler's identity, and multiplying the exponential series by an exponential as follows:

$$\exp[-j(\omega_1-\omega_2)t]^*\{\exp[j(\omega_1-\omega_2)t+(\phi_1-\phi_2)+(\Delta\phi_1-\Delta\phi_2)]+\exp[-j(\omega_1-\omega_2)t+(\phi_1-\phi_2)+(\Delta\phi_1-\Delta\phi_2)]\} \quad (13)$$

The output of the demodulator 330 is therefore:

$$D(t) = \exp[(\varphi_1 - \varphi_2) + (\Delta\varphi_1 - \Delta\varphi_2)] + \exp[-2j(\omega_1 - \omega_2)t + (\varphi_1 - \varphi_2) + (\Delta\varphi_1 - \Delta\varphi_2)] \quad (14)$$

The demodulated signal is directed into a low pass filter 332 and the second term of equation (14) is filtered out.

Finally, the induced phase difference $\Delta\phi_1-\Delta\phi_2$ is obtained when the initial phases are subtracted by arithmetic element 334. As noted above, the phase difference is a function material properties and frequency.

Various techniques may be employed to correlate phase difference values with material values as a function frequency. Accordingly, the induced phase is employed to derive ρ (density), β (bulk modulus), and ξ (shear modulus). These values may be loaded into a look-up table as a function of frequency, á priori, for easy access. The look-up table may be stored in RAM 300. The values obtained in real time are processed and compared to the values stored in the look-up table to identify the material composition of the target-of-interest. Some of the parameter values for ρ, c, and η are shown in Table 1 for steel and iron.

TABLE I

| Parameters | Steel | Iron |
|---|---|---|
| $\rho_0 c_0$ | $47 \times 10^6$ | $33.5 \times 10^6$ |
| $\rho_0$ | 7700 | 7700 |
| η | $27.7 \times 10^{10}$ | $14.5 \times 10^{10}$ |

Figure 3:
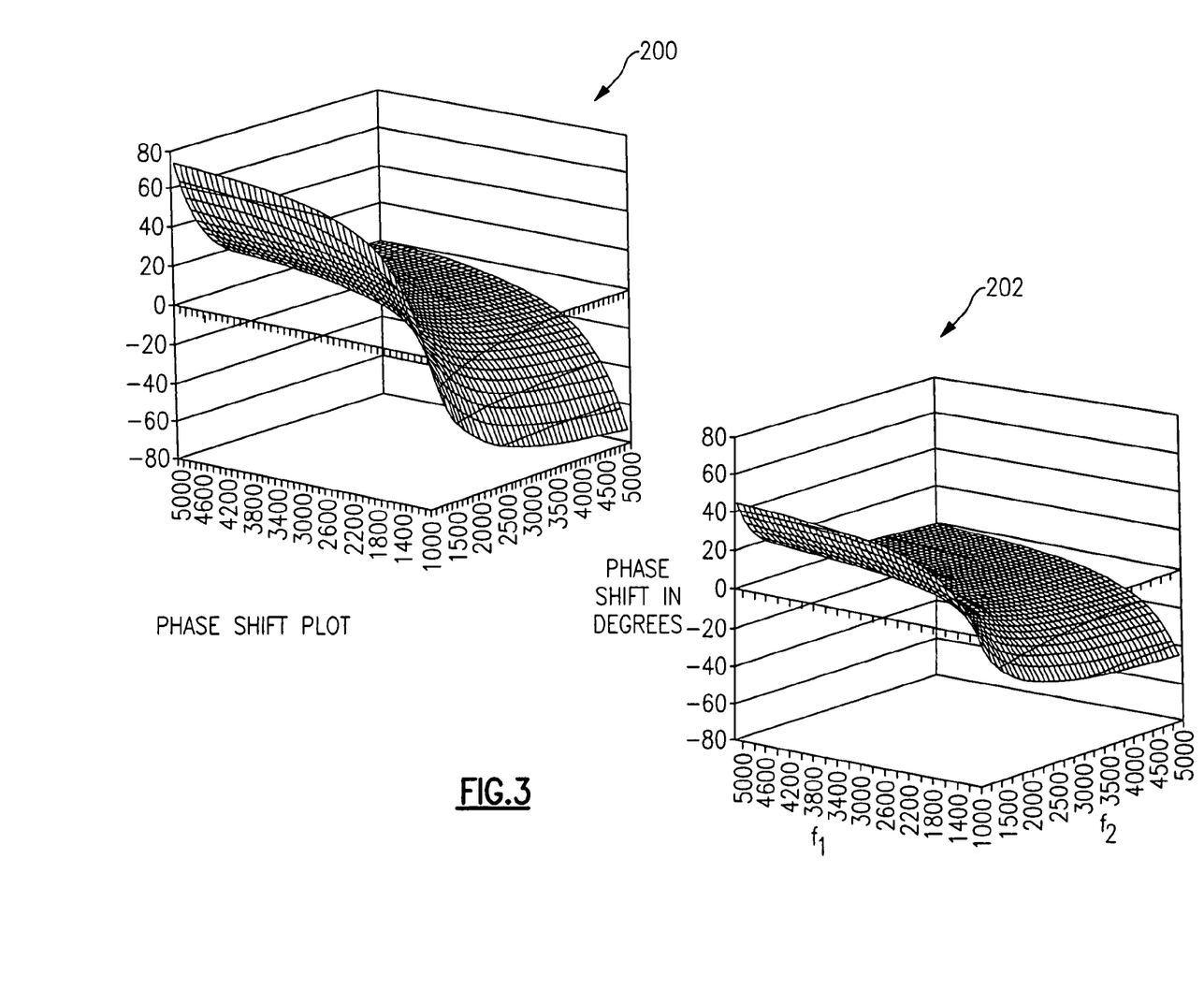
FIG. 3 is a block diagram of the signal processing flow in accordance with a first embodiment of the present invention.

FIG. 3 is a three-dimensional plot comparing the phase shift of a reflected signal for steel (200) and iron (202). The x-axis and the y-axis refer to frequency f1 and f2 respectively. The z-axis refers to the phase shift in degrees. As shown in FIG. 1, the transmitted frequencies are within a range between 1 KHz and 5 KHz. Further, the phase shift is greatest when the frequency separation between the two transmitted signals is the greatest. When both frequencies equal 1 KHz or 5 KHz, the phase shift is approximately zero. When one frequency equals 1 KHz and the other is et to equal 5 KHz, the phase shift reaches its maximum. In one embodiment, the present invention is configured to vary the frequencies over time and record various samples. The three-dimensional plots shown in FIG. 2 may be stored in a look-up table in system memory. The various samples are compared to the data stored in the look-up table to thereby determine the material that is reflecting the return signal.

Figure 4:
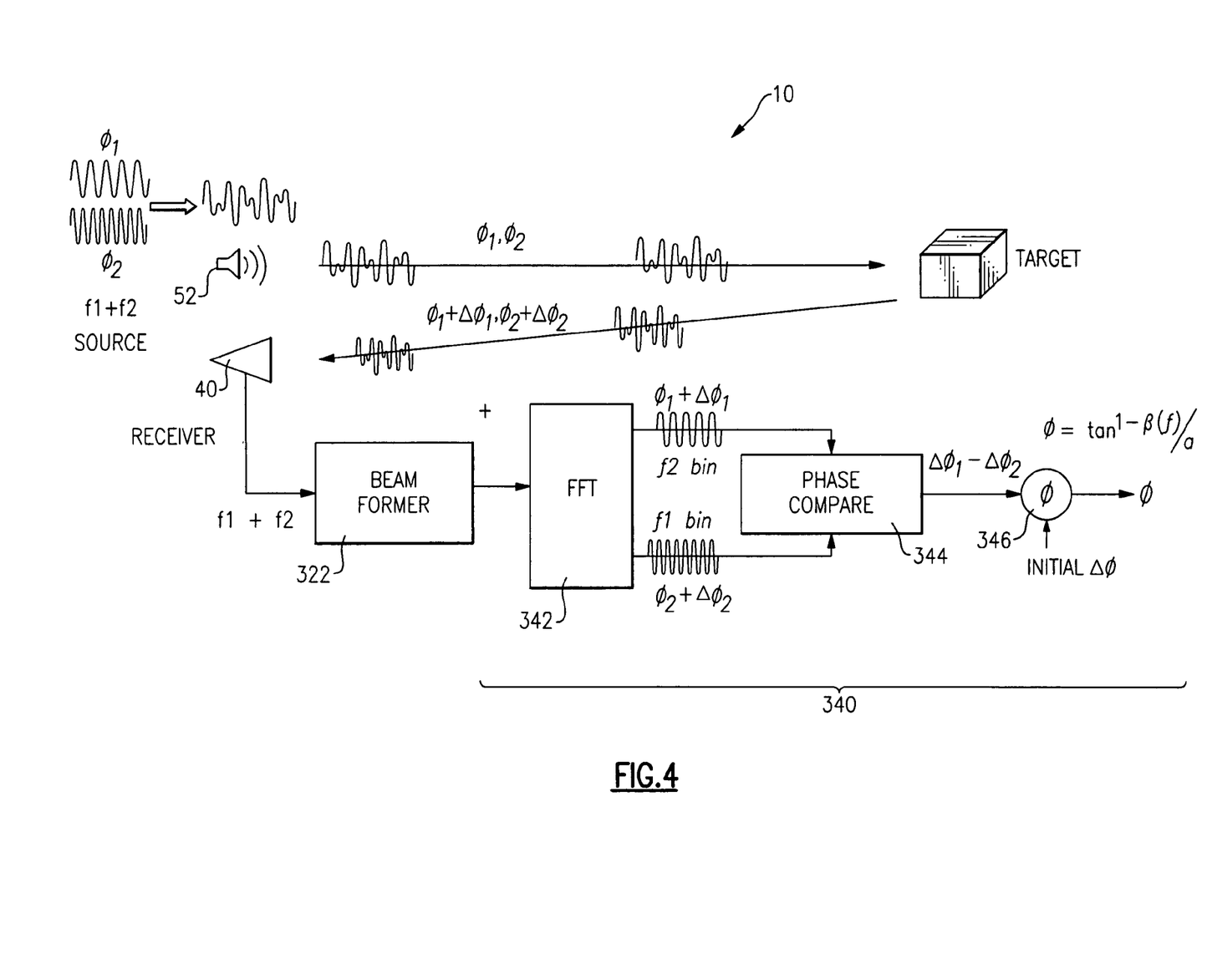
FIG. 4 is a block diagram of the signal processing flow in accordance with a second embodiment of the present invention.

As embodied herein and depicted in FIG. 4, a block diagram of a sonar system in accordance with a second embodiment of the present invention is disclosed. While the embodiment shown in FIG. 2 processes the return signal in the time-domain, the embodiment depicted in FIG. 4 represents a frequency-domain processing approach.

As noted above, the multi-frequency received signal is of the form of equation (11). The receiver 40 obtains R(f) from the hydrophonic sensor element 42 as shown in FIG. 4. Receiver 40 typical includes a pre-amplifier and filter coupled to the hydrophonic sensor element 42. The received signal is directed into an A/D/converter and digitized. The digitized signal is directed into beam former 322. Beam forming is a type of spatial filtering that is configured to distinguish the spatial properties of a return signal from noise and/or interference. A digitized version of the signal characterized by equation (11) is directed into Fast Fourier Transform (FFT) module 342. At this point, equation (11) is transformed into its frequency-domain Fourier transform. As described above, a cosine function, i.e., equation (11), may be expressed as a series of exponentials. Those skilled in the art will recognize that the FFT of an exponential is a delta function [i.e., $\delta(f-f_c)$], wherein "$f_c$" represents the frequency shift from baseband. Accordingly, the Fourier Transform of equation (11) is a series of delta functions frequency shifted by frequency one (1) and frequency two (2).

As noted above, the time-domain processes described relative to FIG. 2 are performed in the frequency domain rather than in the time domain. Accordingly, demodulation is accomplished by frequency shifting the delta functions to base band. However, this step also results in frequency components twice that of frequency one (1) and frequency two (2). The digitized frequency domain signal is directed into phase comparator 344. Subsequently, the initial phase ($\phi_1$, $\phi_2$) and the induced phases ($\Delta\phi_1$, $\Delta\phi_2$) remain. The phase values are directed into arithmetic element 346, which is configured to subtract the initial phase values to obtain the induced phase.

As described above, various techniques may be employed to correlate phase difference values with material values as a function frequency. The values obtained in real time may be processed and compared to the values stored in the look-up table to identify the material composition of the target-of-interest.

Figure 5:
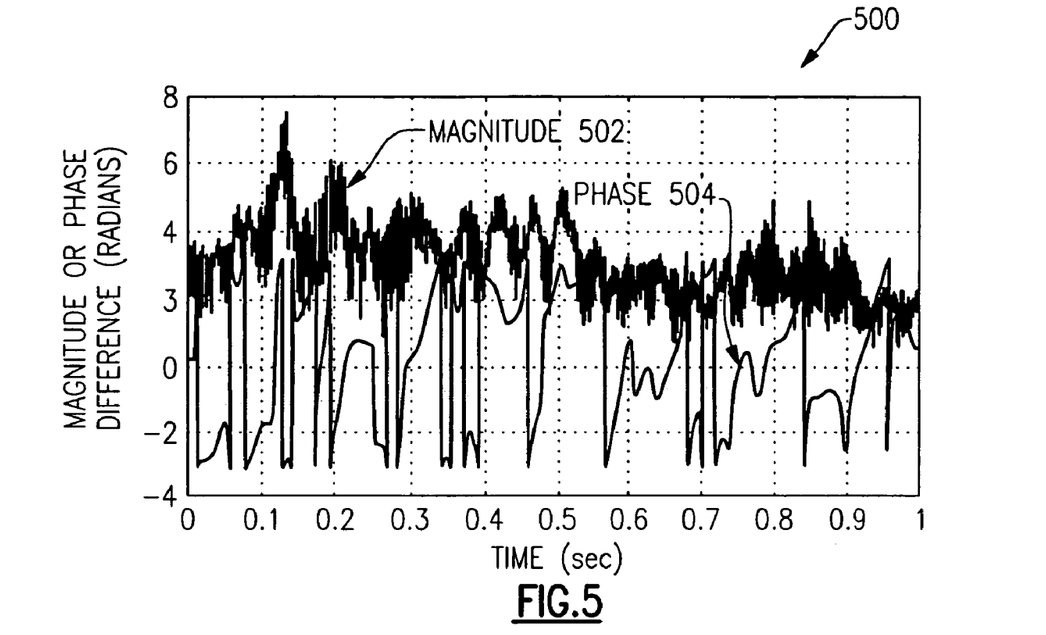
FIG. 5 is a chart showing a comparison of the magnitude of a received signal relative to the phase of the received signal.
Figure 6:
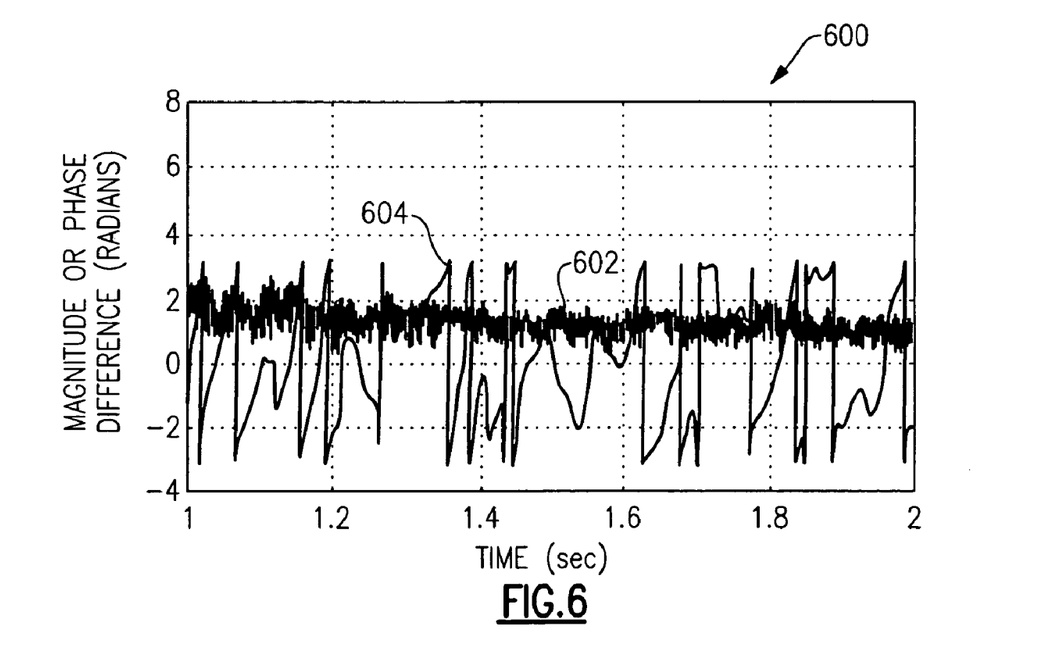
FIG. 6 is another chart showing a comparison of the magnitude of a received signal relative to the phase of the received signal.

Referring to FIG. 5 and FIG. 6, chart 500 and chart 600 provide a comparison of the magnitude (500, 600) of a received signal relative to the phase (502, 602) of the received signal. FIG. 5 compares the magnitude with the phase over a one (1) second interval. For the first second, both the magnitude and the phase exhibit numerous maxima and minima. However, chart 600 shows that the magnitude of the return signal is relatively quiescent after the first second. On the other hand, the phase 604 continues to rotate between negative and positive values. The inventors of the present invention have recognized that the changing phase of the return signal represents target information that may be employed to determine the material composition of targets-of-interest.

Figure 7:
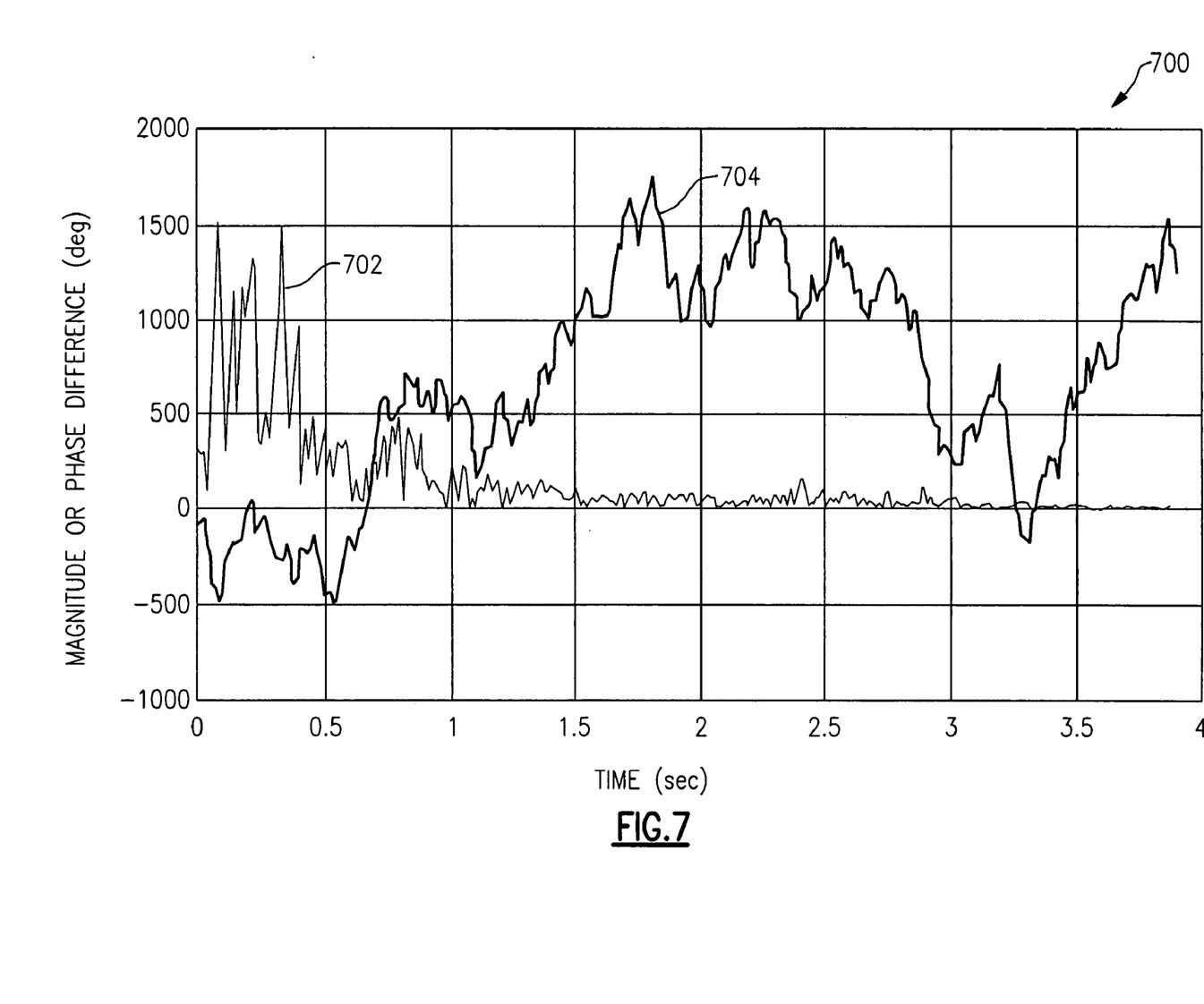
FIG. 7 is a chart comparing the magnitude and the unwrapped phase of a return signal from one active ping.

Referring to FIG. 7, a chart comparing the magnitude and the unwrapped phase of a return signal from one active ping is shown. Those skilled in the art will understand that the term "unwrapped" refers to a non-modulo 2π measurement of the phase. FIG. 7 shows a four (4) second interval. The magnitude of the ping reaches a maximum within approximately the first half-second. The phase difference, on the other hand, does not reach a maximum value until after 1.5 seconds have elapsed.

Figure 8:
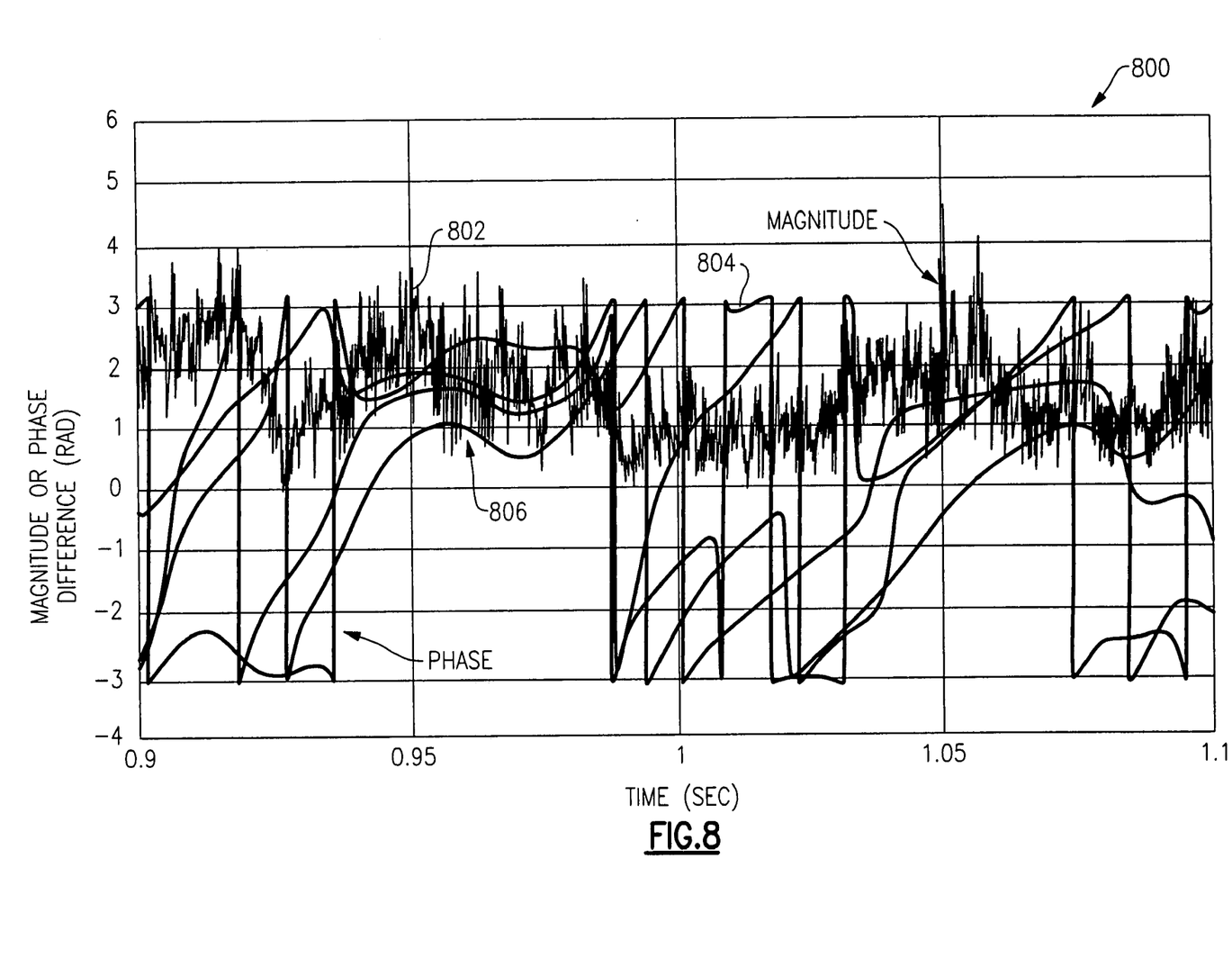
FIG. 8 is a chart comparing the magnitude and the phase of the return signals from four active pings.

FIG. 8 is a chart comparing the magnitude and the phase of the return signals from four active pings. Those skilled in the art will recognize that, like radar, ranging may be calculated by evaluating the time the return signal is received relative to the transmission of the ping. In FIG. 8, reference numeral 806 illustrates the correlation of the phase at the ranges corresponding to approximately 0.95-0.99 seconds.

Figures 9, 10:
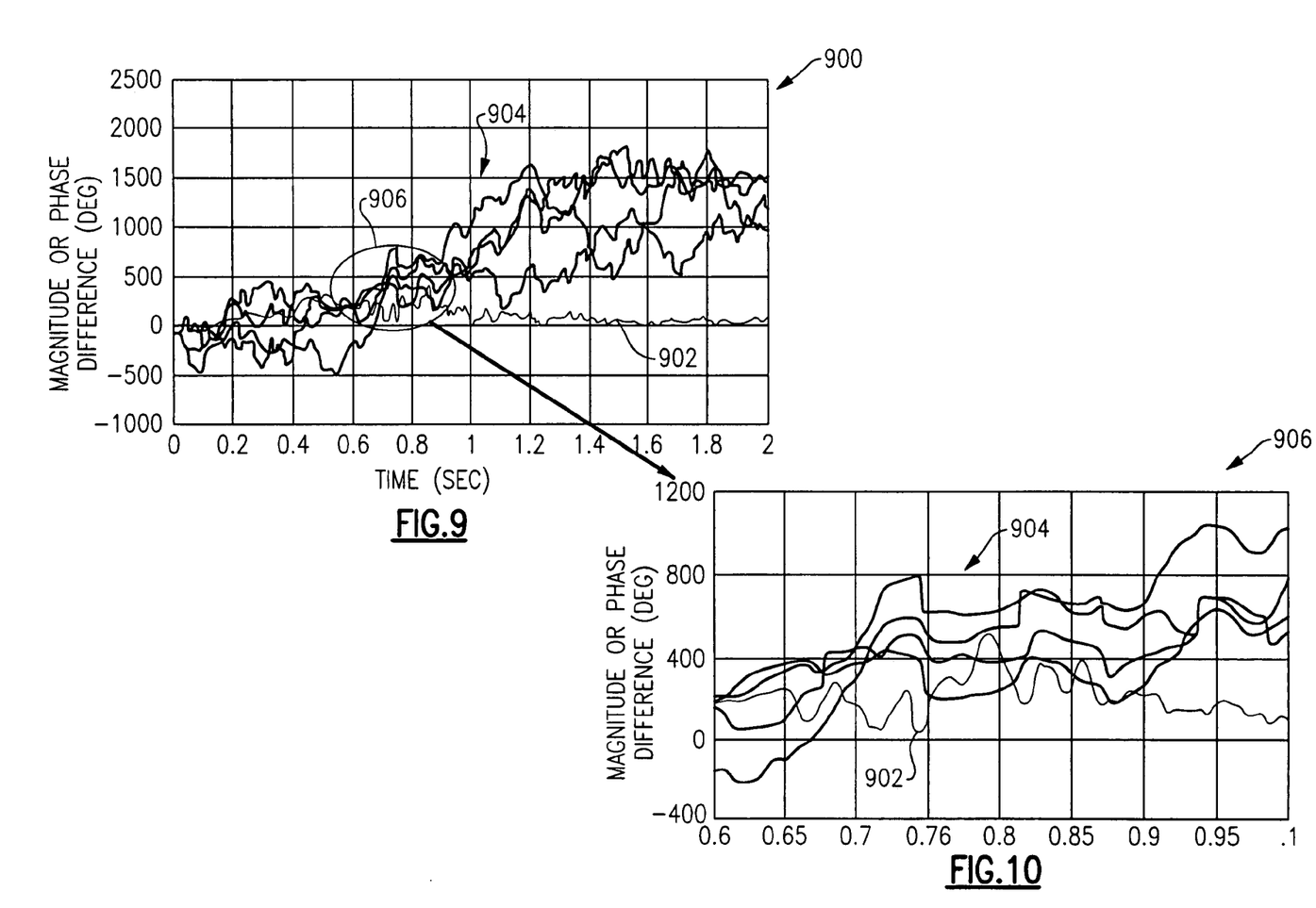
FIG. 9 is a chart comparing the magnitude and the unwrapped phase of the return signals from four active pings.
FIG. 10 is a detail view of a portion of the plot shown in FIG. 9.

FIG. 9 is a chart comparing the magnitude and the unwrapped phase of the return signals from four active pings. FIG. 10 is a detail view of a portion of the plot shown in FIG. 9. These charts also illustrate the correlation of the phase information at various ranges. Specifically, the phase difference waveforms in region 906 are highly correlated. This suggests that phase difference measurements are consistent from ping to ping. The difference from each ping yields a plateau in the range between 0.7 and 0.75 second. On the other hand, the magnitude of the phase shows a marked drop for all of the curves in the range between 0.75 and 0.8 seconds. This may indicate a change in the material composition in the range corresponding to 0.8 seconds.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A sonar system comprising:
    a transmitter configured to direct multi-frequency transmit signals into a propagation channel, each multi-frequency transmit signal including a first frequency and a second frequency;
    a receiver tuned to receive multi-frequency return signals propagating in the propagation channel, each multi-frequency return signal including a first frequency return signal and a second frequency return signal, the first frequency return signal having a first phase and the second frequency return signal having a second phase;
    a signal processor coupled to the receiver, the signal processor being configured to extract the first phase and the second phase from the multi-frequency return signal and calculate a phase difference, the phase difference being the difference between the first phase and the second phase, the phase difference corresponding to an acoustic impedance value of a material disposed in the propagation channel.

2. The system of claim 1, wherein the first frequency and the at least one second frequency are within any sonar frequency range.

3. The system of claim 1, wherein the transmitted signal includes a first sine wave oscillating at the first frequency and a second sine wave oscillating at the second frequency.

4. The system of claim 1, wherein the signal processor is further configured to derive a density value and a Young's modulus value from the acoustic impedance.

5. The system of claim 4, wherein the density value and the Young's modulus value correspond to a real component and an imaginary component of the acoustic impedance.

6. The system of claim 4, wherein the signal processor uses the density value and the Young's modulus value to classify the material reflecting the multi-frequency return signal.

7. The system of claim 1, further comprising a memory coupled to the signal processor, the memory including a look-up table stored therein, the look-up table including stored phase difference values associated with corresponding acoustic impedance values.

8. The system of claim 7, wherein the signal processor correlates the phase difference with a stored phase difference value to thereby derive the acoustic impedance value of the material reflecting the multi-frequency return signal.

9. The system of claim 8, wherein the signal processor determines whether the return signal represents a detected target based on the acoustic impedance value.

10. The system of claim 7, wherein the look-up table includes a material classification for each acoustic impedance value stored therein as a function of frequency.

11. The system of claim 1, wherein the signal processor is further configured to:
    extract a plurality of phase difference values from a sequence of multi-frequency return signals;
    determine an acoustic impedance for each phase difference value of the plurality of phase difference values to obtain a plurality of acoustic impedance values; and
    compare each of the plurality of acoustic impedance values with contiguous acoustic impedance values.

12. The system of claim 11, wherein the signal processor is further configured to detect a target based on the comparison an acoustic impedance value relative to the contiguous impedance values.

13. The system of claim 12, further wherein the signal processor is further configured to determine a location of the target.

14. The system of claim 13, wherein the location of the target includes bearing and range data.

15. The system of claim 12, wherein the signal processor is further configured to determine the target's material composition based on at least some of the plurality of acoustic impedance values.

16. The system of claim 1, wherein the signal processor further comprises:
    a first pass band filter coupled to the receiver and configured to pass the first frequency signal;
    a second pass band filter coupled to the receiver and configured to pass the second frequency signal;
    a multiplier coupled to the first pass band filter and the second pass band filter, the multiplier being configured to multiply the first frequency signal by the second frequency signal;
    a demodulator coupled to the multiplier; and
    a low pass filter coupled to the demodulator, the low pass filter providing the phase difference.

17. The system of claim 16, further comprising an A/D converter coupled to the receiver and configured to convert the first frequency signal and the second frequency signal into digital data.

18. The system of claim 17, wherein at least one of the first pass band filter, the second pass band filter, the multiplier, the demodulator, and/or the low pass filter are implemented in software.

19. The system of claim 16, wherein the signal processor operates in the time-domain.

20. The system of claim 1, wherein the signal processor further comprises:
    a Fourier Transform element coupled to the receiver; and
    a phase comparator coupled to the Fourier Transform element, the phase comparator being configured to provide the phase difference.

21. The system of claim 20, further comprising an A/D converter coupled to the receiver and configured to convert the first frequency signal and the second frequency signal into digital data.

22. The system of claim 21, wherein the Fourier Transform element and the phase comparator are implemented in software.

23. The system of claim 1, wherein the multi-frequency transmit signal includes at least one third frequency, and the multi-frequency return signal includes at least one third frequency return signal having at least one third phase.

24. A method for detecting an object comprising:
transmitting a multi-frequency signal into a propagation channel, the multi-frequency transmit signal including a first frequency and a second frequency;
receiving a multi-frequency return signal propagating in the propagation channel, the multi-frequency return signal including a first frequency return signal and a second frequency return signal, the first frequency return signal having a first phase and the second frequency return signal having a second phase; and
extracting a phase difference from the multi-frequency return signal, the phase difference being the difference between the first phase and the at least one second phase, the phase difference corresponding to an acoustic impedance value of a material disposed in the propagation channel.

25. The method of claim 24, wherein the step of extracting includes:
extracting the first phase and the second phase from the multi-frequency return signal; and
calculating the difference between the first phase and the second phase.

26. The method of claim 24, wherein the first frequency and the at least one second frequency are within any sonar frequency range.

27. The method of claim 24, further comprising the step of deriving a density value and a Young's modulus value from the acoustic impedance.

28. The method of claim 27, wherein the density value and the Young's modulus value correspond to a real component and an imaginary component of the acoustic impedance.

29. The method of claim 28, further comprising the step of using the density value and the Young's modulus value to classify the material reflecting the multi-frequency return signal.

30. The method of claim 25, further comprising:
extracting a plurality of phase difference values from a sequence of multi-frequency return signals;
determining an acoustic impedance for each phase difference value of the plurality of phase difference values to obtain a plurality of acoustic impedance values; and
comparing each of the plurality of acoustic impedance values with contiguous acoustic impedance values.

31. The method of claim 30, further comprising the step of detecting a target based on the comparison an acoustic impedance value relative to the contiguous impedance values.

32. The method of claim 31, wherein the step of detecting includes the step of determining a location of the target.

33. The method of claim 32, wherein the location of the target includes bearing and range data.

34. The method of claim 32, wherein the step of detecting includes the step of determining the target's material composition based on at least some of the plurality of acoustic impedance values.

35. The method of claim 25, wherein the step of extracting is performed in the time domain.

36. The method of claim 25, wherein the step of extracting further comprises:
filtering the multi-frequency return signal to obtain the first frequency return signal;
filtering the multi-frequency return signal to obtain the second frequency return signal;
multiplying the first frequency return signal by the second frequency return signal to obtain a resultant signal;
demodulating the resultant signal to obtain a demodulated signal; and
filtering the demodulated signal to obtain the first phase and the second phase.

37. The method of claim 36, further comprising the step of calculating the phase difference.

38. The method of claim 25, wherein the step of extracting is at least partially performed in the Frequency domain.

39. The method of claim 38, wherein the first phase and the second phase are obtained by performing Fast Fourier Transforms.

40. A sonar receiver system comprising:
a receiver tuned to receive multi-frequency return signals propagating in the propagation channel, each multi-frequency return signal including a first frequency return signal and a second frequency return signal, the first frequency return signal having a first phase and the second frequency return signal having a second phase; and
a signal processor coupled to the receiver, the signal processor being configured to extract the first phase and the second phase from the multi-frequency return signal and calculate a phase difference, the phase difference being the difference between the first phase and the second phase, the phase difference corresponding to an acoustic impedance value of a material disposed in the propagation channel.

41. A sonar receiver system comprising:
a receiver tuned to receive multi-frequency return signals propagating in the propagation channel, each multi-frequency return signal including a first frequency return signal and a second frequency return signal, the first frequency return signal having a first phase and the second frequency return signal having a second phase; and
a signal processor coupled to the receiver, the signal processor being programmed to, extract a plurality of phase difference values from a sequence of multi-frequency return signals,
determine an acoustic impedance for each phase difference value of the plurality of phase difference values to obtain a plurality of acoustic impedance values,
compare each of the plurality of acoustic impedance values with at least one contiguous acoustic impedance value, and
perform a target detection decision based on the comparison of each of the plurality of acoustic impedance values with the at least one contiguous acoustic impedance value.

42. The system of claim 41, wherein the signal processor is further configured to determine a location of a detected target.

43. The system of claim 41, wherein the location of the detected target includes bearing and range data.

44. The system of claim 41, wherein the signal processor is a digital signal processor.

* * * * *